Nov. 4, 1969  G. F. RITTER, JR  3,476,542
APPARATUS FOR SPRAY COOLING GLASS SHEETS
Filed April 18, 1966  4 Sheets-Sheet 1

INVENTOR.
George F. Ritter, Jr.
BY
Nobbe & Swope
ATTORNEYS

Nov. 4, 1969  G. F. RITTER, JR  3,476,542
APPARATUS FOR SPRAY COOLING GLASS SHEETS
Filed April 18, 1966  4 Sheets-Sheet 2

INVENTOR.
George F. Ritter, Jr.
BY
Nobbe & Swope
ATTORNEYS

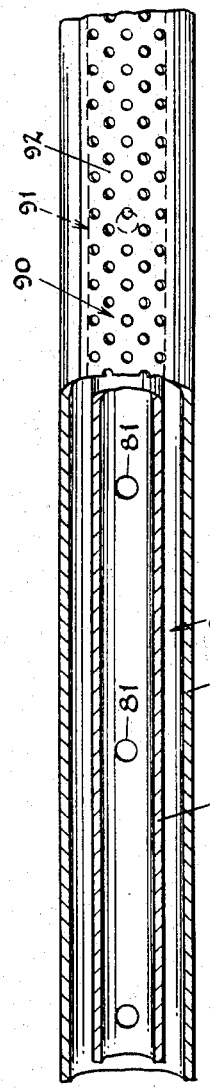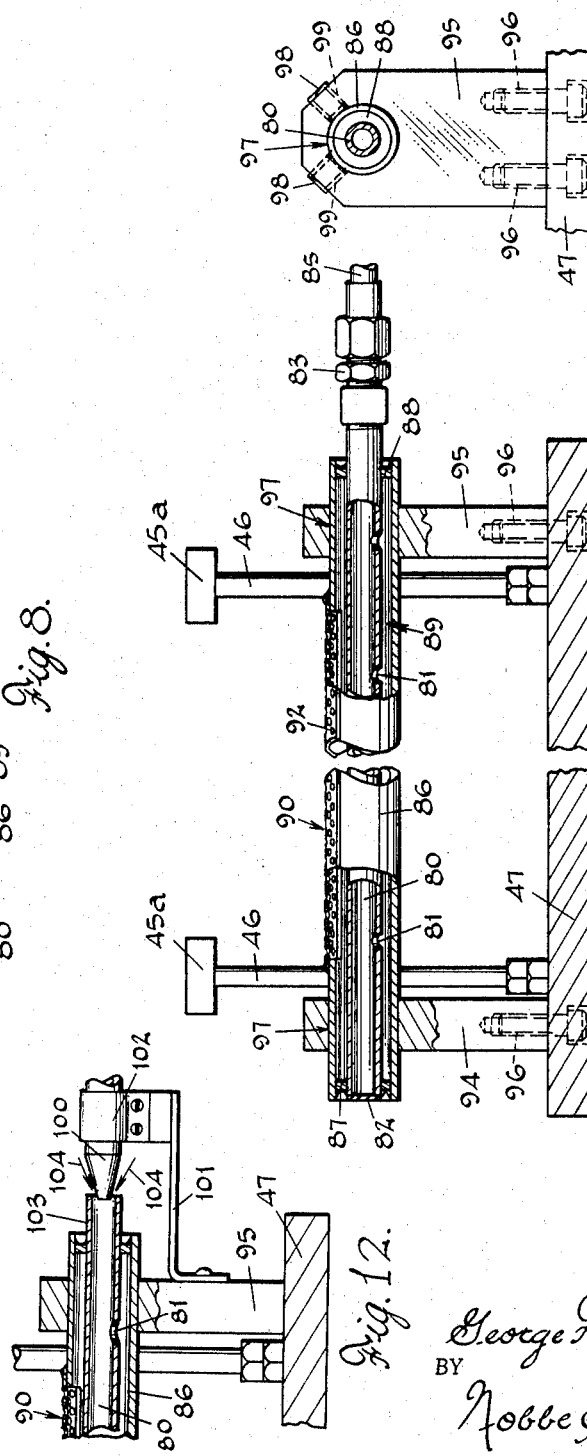

United States Patent Office 3,476,542
Patented Nov. 4, 1969

3,476,542
APPARATUS FOR SPRAY COOLING
GLASS SHEETS
George F. Ritter, Jr., Toledo, Ohio, assignor to Libbey-Owens-Ford Company, Toledo, Ohio, a corporation of Ohio
Filed Apr. 18, 1966, Ser. No. 543,117
Int. Cl. C03b 23/06, 27/00
U.S. Cl. 65—268                            3 Claims

ABSTRACT OF THE DISCLOSURE

Apparatus for setting a glass sheet in the desired curvature after being press bent and while the sheet is still in contact with one of the shaping surfaces of the bending mold. The sheet is cooled by streams of pressurized gas with apparatus provided to diffuse the streams before they strike the glass, thus permitting a high volume flow of gas to be directed against the sheets without danger of surface damage.

---

This invention relates generally to production of curved tempered sheets of glass and more particularly to a new and improved apparatus for heat treating glass sheets.

Curved sheets of glass are widely used as glazing closures particularly as windows for vehicles, such as automobiles or the like. To be suitable for such applications the curved sheets must be bent to rather precise curvature dictated by the way in which they are to be mounted and by the over-all style of the vehicle. At the same time, it is important that the sheets meet rather stringent optical requirements, more particularly that the viewing area of the window be free of any optical defects which would tend to interfere with clear vision through the window.

In addition, it is necessary for the bent sheets, intended for use as glazing closures in vehicles, to be tempered to increase their resistance to damage resulting from impact. As is well known, tempering glass sheets will modify the breaking characteristics of glass whereby, if the tempered sheet should be broken, it will disintegrate into relatively small harmless particles as opposed to large, jagged, dangerous pieces resulting when ordinary untempered glass sheets are broken.

In general, the commercial production of curved tempered sheets of glass is accomplished by heating substantially flat sheets of glass to an elevated temperature at which the glass may be bent or formed to the desired curvature, bending the heated sheets on a shaping surface and thereafter chilling the heated bent sheets to rapidly reduce the temperature thereof to place the outer surfaces of the sheet in compression while placing the central portion in tension.

In the production of bent and tempered sheets in relatively large quantities, such as would be encountered in the commercial production for glazing closures of automobiles or the like, the sheets are heated, bent and tempered in a substantially continuous procedure while being moved successively, one by one, along a predetermined path through a heating area, a bending area and a tempering area. These areas are contiguous so that individual sheets upon being moved through one area pass immediately into and through the following area. By this procedure the heat imparted to the sheet to bring it to the proper bending temperature is utilized in the tempering process.

The primary object of the present invention is to provide an improved apparatus for producing curved tempered glass sheets having precisely defined curvatures and improved optical properties.

Another object is to provide improved apparatus for setting the curvature of a heated bent glass sheet immediately after being bent without producing optical defects in the finished unit.

A further object is to provide cooling means for setting the curvature of bent sheets which includes means for increasing the volume of pressurized cooling gases while reducing the pressure thereof and distributing the cooling gases before striking the sheet surface.

Other objects and advantages of the invention will become more apparent during the course of the following description when read in connection with the accompanying drawings.

In the drawings, wherein like numerals are employed to designate like parts throughout the same:

FIG. 8 is an enlarged fragmentary side elevation view, partially in section, of the member shown in FIG. 7;

FIG. 9 is an enlarged fragmentary view, partially in section, taken along lines 5—5 of FIG. 2;

FIG. 10 is an end view of the details shown in FIG. 9;

FIG. 12 is a fragmentary enlarged side elevation view, partially in section, of a modified form of the invention.

Figure 1:
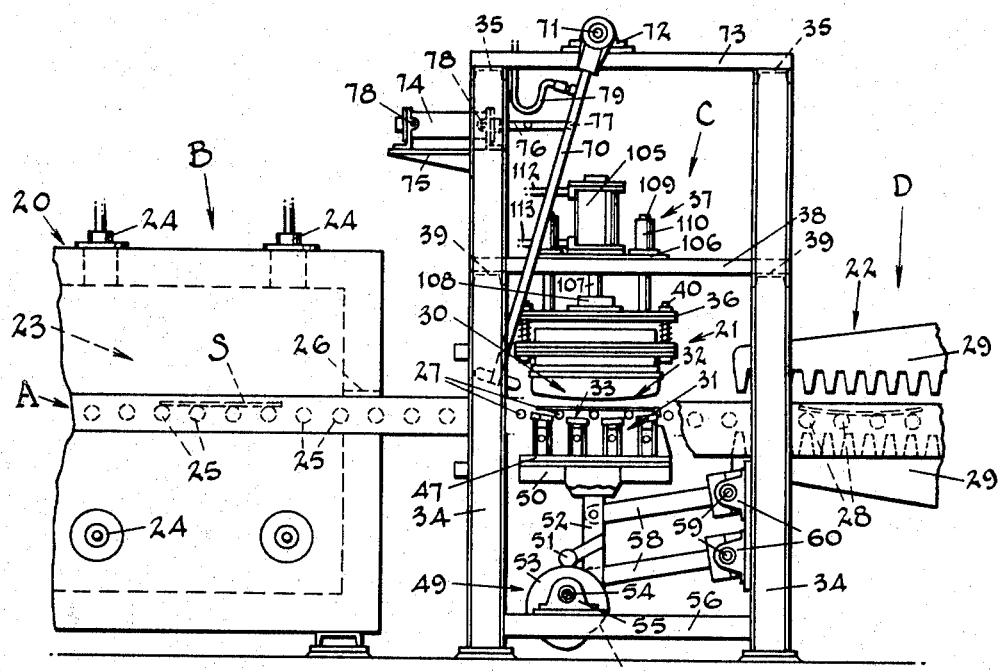
FIG. 1 is a side elevational view of a bending and tempering apparatus incorporating the features of the present invention.

In the drawings, for purposes of illustration, the features of the present invention are shown incorporated into an apparatus (FIG. 1) particularly adapted for the continuous production of bent and tempered sheets of glass by a process similar to that described above. The apparatus includes a conveyor system A operable to carry glass sheets S along a predetermined substantially horizontal path through an area B comprising a furnace 20 for heating the sheets to the desired temperature, an area C including bending means 21 for forming the heated sheets to the desired curvature and an area D having chilling means 22 for rapidly reducing the temperature of the sheets to provide the desired temper therein.

In the present instance the glass sheets S are heated in the furnace 20 which is of the tunnel type and has an elongated heating chamber 23, defined by refractory walls, and heated by suitable burners or equivalent heating devices 24. The flat glass sheets to be heated are advanced through the heating chamber by a first conveyor comprising a plurality of spaced conveyor rolls 25, which form a part of the conveyor system A, extending from the entrance end (not shown) to an oppositely disposed exit end of the furnace. The conveyor rolls 25 are driven in unison by a power source (not shown) to move the sheets through the heating chamber where they are heated to substantially their bending temperature and, upon emerging from an opening 26 at the exit end of the furnace, are received on a second conveyor consisting of a plurality of transversely extending and longitudinally spaced rolls 27, also a part of the conveyor system A. The heated sheets are moved along the path by the conveyor rolls 27, driven by a power source P (FIG. 3), into the bending area C where they are formed to the desired curvature by the bending means 21.

After being bent, the sheets continue along the path on to a third conveyor consisting of a plurality of spaced rolls 28, also a part of the conveyor system A, which are driven in common by a power source (not shown) to move the sheets through the tempering area D past the chilling means 22. In the illustrative embodiment the chilling means 22 include blastheads 29 disposed above and below the path operable to direct opposed blasts of cooling fluid, such as air, towards and against the opposed surfaces of the sheets moving along the path.

In the illustrated apparatus, the bending means 21 comprises a bending mold having first and second mold parts 30 and 31 adapted to press the heat softened glass sheets into the desired configuration. For this purpose, complemental interfitting shaping surfaces 32 and 33 are formed on the respective faces of the mold parts 30 and 31 which are movable relative to each other and to the path to bring the shaping surfaces into pressing engagement with opposite sides of the heated sheets.

The mold parts 30 and 31 are carried by a suitable support framework which includes two upright columns 34 at each side of the path and spaced apart longitudinally along the path with the coresponding columns at opposite sides of the path being transversely aligned. The columns 34 extend above the conveyor rolls 27 and are interconnected at their upper ends with beams 35 extending horizontally above the path and secured at their opposite ends to respective columns to thereby form a rigid box-like structure with the columns.

As mentioned above, the glass sheets are shaped to the desired curvature by being pressed between the shaping surfaces 32 and 33 formed on the relatively movable mold parts 30 and 31. To this end, the mold parts are mounted for relative movement with respect to each other between an open position, wherein the mold parts are spaced apart, and a closed position, wherein the shaping surfaces on the mold parts are in close proximity to each other and operable to press a glass sheet therebetween.

While either or both of the mold parts may be moved to press the sheet between the complemental shaping surface, in the present instance the first or upper mold part 30 remains substantially stationary and the second or lower mold part is mounted to reciprocate back and forth transversely of the path toward and away from the upper mold part. In this manner, as a heated sheet is carried along the path by the conveyor rolls 27 into the bending area C and between the mold parts it is moved out of the path by the lower mold part 31 into pressing engagement with the upper mold part to form the sheet to the desired shape after which it is returned to the conveyor rolls and moved into the tempering area D.

Figures 3, 4:
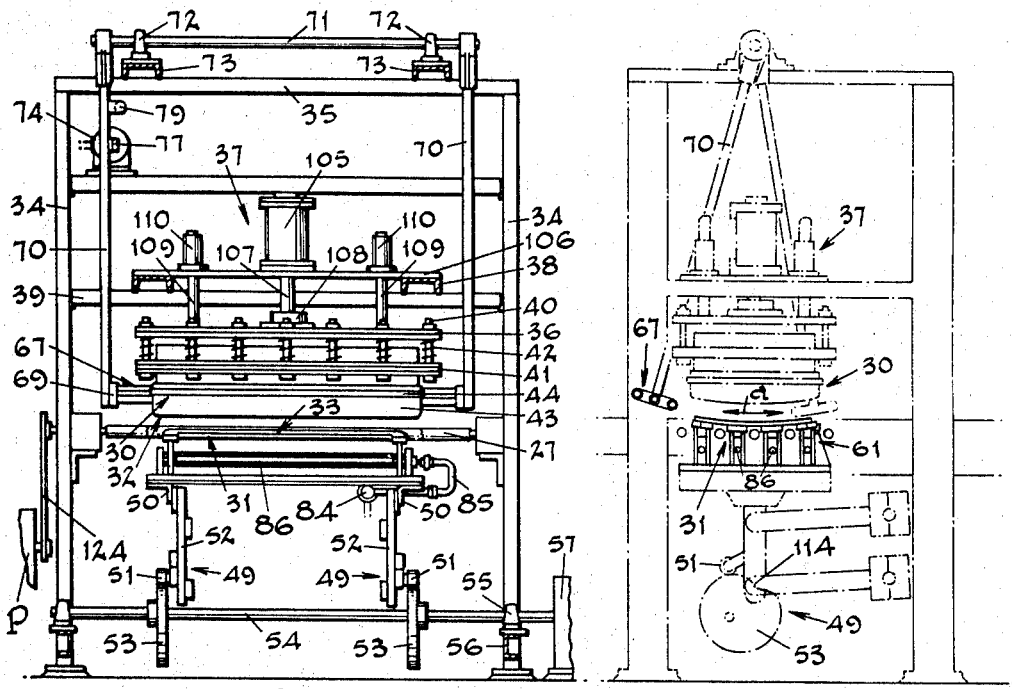
FIG. 3 is an end elevational view of the bending area of FIG. 1.
FIG. 4 is a side elevational view of the bending area showing the features of the present invention with the remaining bending apparatus being shown in phantom lines.

As shown in FIGS. 1 and 3, the upper mold part 30 is supported above the path on a mounting frame 36 by mounting means 37, which will be described in detail hereinafter. The mounting means 37 is supported on beams 38 extending longitudinally along the path and supported at their opposite ends on transversely extending beams 39 which are secured to the columns 34.

The upper mold part is supported on the mounting frame 36 (FIG. 3) by bolts 40 passing through a flange 41, formed integrally with and projecting horizontally outwardly from the upper mold part, and openings in the mounting frame. The mold part 30 is held in spaced relation to the mounting frame by resilient means, such as coil springs 42, telescoped on the bolts and acting between the opposed surfaces of the flange 40 on the mold and the mounting frame. The coil springs serve to permit yielding of the upper mold part to prevent excessive pressure from being exerted on the glass sheets as the lower mold part 31 is moved into pressing engagement therewith. Furthermore, the shaping surface of the mold 30 may be adjusted relative to the plane of the path by tightening or loosening the nuts on the bolts to thereby compress or relieve the springs.

The mold parts may be of any construction and formed of a variety of materials capable of withstanding the rather high temperature to which the mold is subjected.

Herein, the upper mold part 30 comprises a cup-shaped structure, formed of metal or plaster, having a generally convex surface formed on the downwardly directed face thereof which forms a continuous shaping surface 32. Therefore, the entire upper surface of the sheets will be engaged by the shaping surface of the mold part to insure that the inner areas of the sheets will be formed precisely to the desired curvature.

This, of course, means that the upper surfaces lying within the viewing areas of the finished windows are likely to be marred as a result of the contact. In order to avoid marring the glass sheets and to better enable the upper or male mold part 30 to withstand the high temperatures to which it is subjected, the shaping surface may be covered with a heat resistant, nonabrasive material 43, such as glass cloth, held in place by a band 44 encircling the mold part.

Figure 2:
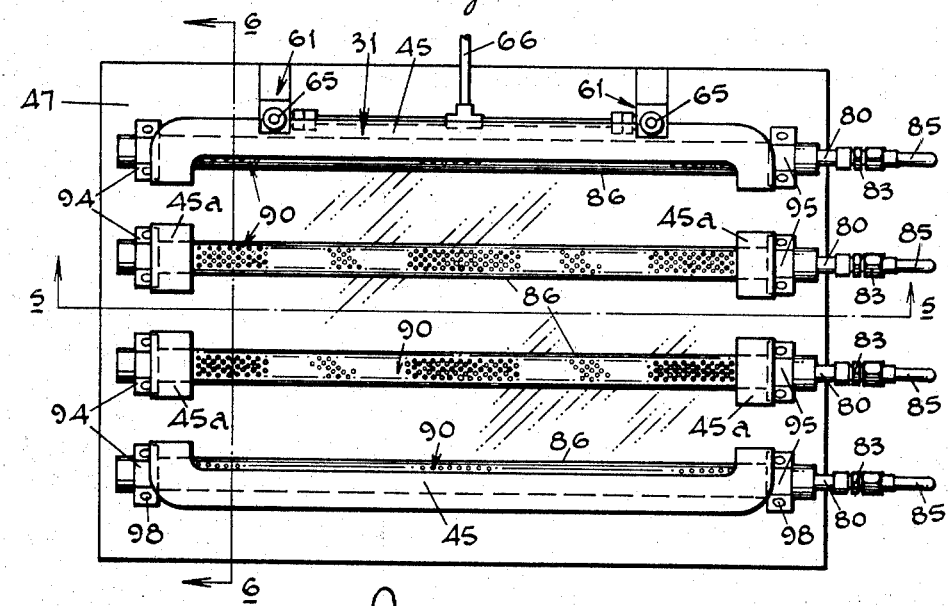
FIG. 2 is a plane view of details of the bending means of FIG. 1.
Figure 5:
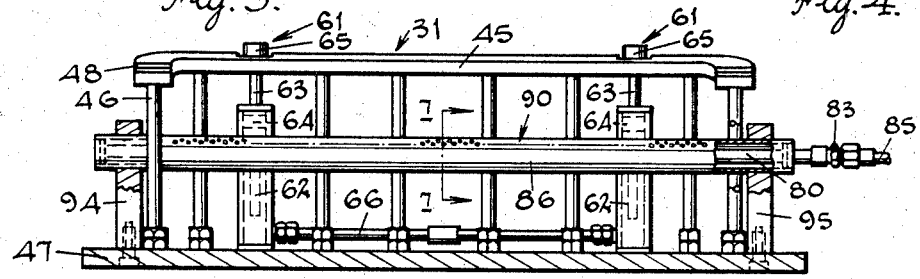
FIG. 5 is a vertical sectional view taken along lines 5—5 of FIG. 2.
Figure 6:
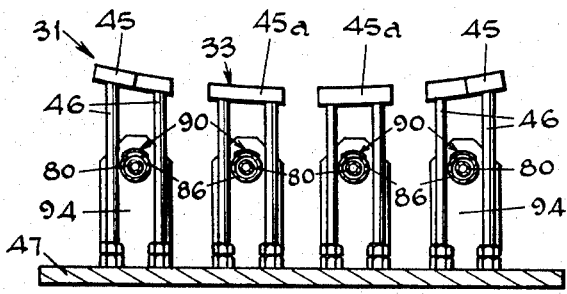
FIG. 6 is a transverse vertical sectional view taken along lines 6—6 of FIG. 2.

The lower mold part 31 is an open ring-type structure which engages only the marginal portions of the sheet to avoid marring those portions of the undersurface of the sheet which lie within the viewing area of the finished window. For this purpose, the lower or female mold part 31 (FIG. 2) is formed by bars 45, preferably made of metal or similar material able to withstand the high temperatures to which the mold is subjected. The bars 45 are illustratively shown in FIG. 2 as arranged in a rectangular quadrangle conforming in plan to the outline of the glass sheets and having the shaping surface 33 formed on their upwardly directed sides to conform in elevation to the curvature of the sheets when bent. The bars are held in position by rods 46 (FIG. 5) upstanding from a base 47.

The metallic materials have a tendency to fuse to glass when the latter is heated to the elevated temperature necessary for bending which will produce defects in the finished window. To avoid this, the sheet contacting surface of the mold part or more particularly the bars are provided with a cover 48 of refractory material which will not fuse to the heated sheets.

In order that the female mold part may pass between the conveyor rolls 27 between the open and closed positions, the longitudinally extending sides of bars of the ring are divided into short segments 45a (FIG. 2) arranged end-to-end with their adjacent ends spaced apart a sufficient distance so that the segments may pass between spaced adjacent rollers 27 (FIG. 1).

The mold parts are illustratively shown as being substantially rectangular in outline with the longitudinal sides of the rectangle extending transversely of the path of movement of the sheets. However, it will be appreciated that the particular outline of the mold parts is dictated by the outline shape of the glass sheets to be bent and any desired outline may be utilized. In fact, if desired, two sets of mold parts may be located in the bending area and spaced transversely of the path so that a pair of glass sheets may be simultaneously bent.

As was stated above, the lower mold part 31 is mounted for relative movement transversely or vertically of the path from a position below the plane of the path to a position above the plane of the path wherein the shaping surface of the mold parts are disposed in close proximity to each other.

Raising and lowering of the lower or female mold part toward and away from the male or upper mold part is accomplished by any suitable actuating means or mechanism connected to the base of the lower mold part. While a variety of different types of mechanisms may be employed to impart the desired reciprocal motion, a simple cam and follower mechanism 49 is illustratively shown in FIGS. 1 and 3. Herein, two such actuating mechanisms are provided which are transversely spaced along the path and are connected at the opposite sides of the base 47 by angle irons 50. However, since the mechanisms are identical in construction, a detailed description of one will be sufficient for the present purposes.

The actuating mechanism 49 (FIG. 1) includes a cam follower 51, secured to a bar 52 connected to and depending from one leg of the angle iron 50. The cam follower is adapted to ride on the outer periphery of the disc cam 53 shaped to impart the desired sequence of motion to the carriage and lower mold part. The cam is rigidly secured to a shaft 54 extending transversely of the path below the lower mold part with opposite ends of the shaft journaled in bearings 55 mounted on beams 56 extending longitudinally of the path and secured to the columns 34. One end of the shaft projects outwardly beyond the framework and is connected to a driving means or power source 57 (FIG. 3) which is operable to rotate the shaft about a fixed horizontal axis.

The lower mold part is guided for vertical movement by a pair of spaced elongated members 58 extending between the bar 52 and the column 34 with one end of each of the elongated members pivotally secured to the bar and the opposite end attached to shafts 59 extending between the transversely aligned columns 34. The shafts are journaled adjacent their opposite ends in bearings 60 carried by the columns 34. In this manner, the bar, columns and the elongated members form a four bar linkage with the bar 52 and the vertically disposed columns 34 forming one pair of bars of the linkage while the spaced elongated members 58 form the second pair of bars of the linkage.

In order to insure that the respective sheets are properly located relative to the shaping surfaces, locating devices 61 (FIGS. 2 and 5) are disposed adjacent one edge of the mold parts and are spaced transversely of the path with a portion thereof adapted to be moved into and out of the path and be engaged by the leading edge of the moving sheet. The locating devices 61 (FIG. 5), in the illustrative embodiment, include fluid cylinders 62 supported on the base of the lower mold part and each having a rod 63 with an enlarged piston 64 slidably received in the cylinder. The upper end of the rod is provided with an enlarged portion or stop 65 which is movable into and out of the path of the moving sheet. When fluid pressure is applied to the lower end of the cylinder through conduits 66 connected to a source of pressure (not shown) the stops 65 will be raised and moved into the path of the moving sheet and when the source of pressure is relieved the stops are moved below the path of the sheet by gravity acting upon the enlarged weighted pistons.

The operation of the continuous bending and tempering apparatus can readily be appreciated by reference to FIG. 1. Flat glass sheets S are loaded onto the conveyor rolls 25 at the entrance end (not shown) of the furnace and moved through the heating chamber 23 wherein the sheets are heated to their bending temperature. Each heated sheet passes through the opening 26 and is received on the conveyor rolls 27 to be moved into the bending area between the bending means 21. The sheet is accurately located between the complemental shaping surfaces 32 and 33 by having the leading edges engage the stops 65 located in the path of the moving sheet. The shaft 54 is then rotated to lift the sheet off the conveyor rolls into pressing engagement between the complemental shaping surfaces to be bent to the desired curvature and to thereafter return the bent sheet to the conveyor rolls 27 to be moved from the bending area onto the conveyor rolls 28 of the tempering area wherein the sheets are rapidly reduced in temperature to produce the desired temper therein.

As can readily be appreciated, in the bending process outlined above, the sheets are still in a heated condition when they are returned to the conveyor to be moved from the bending area into and through the tempering area. Therefore, the sheets which are in a somewhat softened condition, have a tendency to sag towards the conveyor to thereby lose their precisely defined curvature, Furthermore, when the heated sheets are returned to the conveyor there is a great tendency for the somewhat softened sheet to acquire defects on the surface thereof due to marring or other imperfections as the sheet is received on the conveyor rolls and moved from the bending area to the tempering area.

To alleviate these problems the present invention contemplates slightly cooling the sheets by directing cooling fluid or gases, such as air, towards the opposed surfaces of the heated sheets before they are returned to the conveyor to reduce their temperature to a point below where the glass takes a set, thereby rendering the sheet more rigid.

Herein, the means for cooling one or the upper surface includes tubular members having orifices therein opening towards the path of the moving sheet with means for supplying cooling gases to the tubular members to flow in streams towards the sheet surface. The tubular members are mounted for movement back and forth across the surface of the sheet so that each stream will cover a certain area of a sheet surface during the cooling thereof.

In the illustrative embodiment of the invention, the upper tubular members 67 (FIG. 3 and 4) for cooling the upper surface of the bent heated sheet provided with openings or orifices 68 (FIG. 11) opening towards the sheet. The tubular members are normally disposed in an out-of-way position at one side of the upper mold part 30 and mounted to be moved across the upper surface of the glass sheet.

In cooling the lower surface of the sheet it is important that a large volume of cooling gases at a relatively low pressure is available at the sheet surface. Furthermore, it is also important that localized streams of cooling gases striking the sheet surface be eliminated since such localized streams cause optical distortion in the finished unit.

The solution to these problems is complicated by the limited space available adjacent the lower sheet surface, in the bending apparatus outlined above, and by the fact that the cooling means should be small enough to pass between the conveyor rolls to be in close proximity to the sheet surface when the cooling gases are supplied therethrough.

According to the invention, the cooling means for the lower surface of the sheet includes a small tubular member located in close proximity to the shaping surface of the lower mold part which is capable of receiving high pressure cooling gases to flow outwardly in streams with means associated with the tubular member for reducing the pressure of the gases flowing from the tubular members and distributing these gases evenly along the length of the cooling means to impinge on the sheet surface. By providing a plurality of spaced tubular members adjacent the lower sheet surface the entire surface can be evenly cooled with gases having a low pressure which are sufficiently diffused to provide a blanket or layer of air striking the sheet surface thereby eliminating any optical distortion in the finished sheet.

Herein, the cooling means for cooling the lower surfaces of the glass sheets include a plurality of spaced tubular members having spaced openings directed away from the sheet surface with encompassing means surrounding each tubular member which directs the streams of cooling gases towards the sheet surface and diffuses the streams to provide a layer of evenly distributed gases striking the sheet surface along the length of the cooling means.

In the illustrative embodiment of the invention, as shown in FIGS. 8 and 9, the cooling means includes a plurality of spaced tubular members 80 (FIGS. 2, 8 and 9) having a plurality of spaced openings or orifices 81 opening away from the shaping surface of the lower mold part. One end of each tubular member is sealed by a plate 82 and the opposite end is provided with a coupling 83 connecting the tubular member to a manifold 84 (FIG. 3) through a conduit 85.

Figure 7:
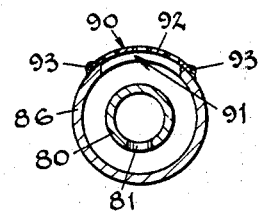
FIG. 7 is an enlarged detailed sectional view taken along lines 7—7 of FIG. 5.

The encompassing means surrounding the tubular members each include a hollow shell or second tubular member 86, slightly larger in diameter than the first tubular member 80, which is positioned in coaxial alignment with the tubular member 80. The shell and tubular member are held in spaced relation by plates 87 and 88 which enclose the respective ends of a passageway 89 formed between the tubular member 80 and the shell 86. The shell is provided with a perforated portion 90 which is located adjacent the shaping surface of the lower mold part. Although the perforated portion may be formed by providing a plurality of openings in the shell wall, in the illustrative embodiment (FIG. 7), the perforated portion is formed by an elongated slot or opening 91 in the top wall portion of the shell with a screen member 92 covering the elongated slot or opening and being secured to the shell at 93, as by welding.

Each of the cooling means is secured in spaced relation between the base of the lower mold part and the shaping surface by brackets 94 and 95 (FIG. 9) secured to the base by bolts 96 with openings 97 being provided adjacent the upper ends of the brackets for receiving opposite end portions of the shell 86. The shell is held in fixed position on the brackets by set screws 98 received in threaded openings 99 in the brackets.

In this manner, when fluid gases at a relatively high pressure are supplied to the tubular members 80, the gases will flow in streams through the openings 81 directed away from the shaping surface of the lower mold part. The streams of gases are received in the passageway 89 formed between the tubular member and the shell, wherein they are allowed to expand thereby reducing the pressure thereof. The streams upon leaving the passageway, must pass the foraminous portion of the shell which diffuses the streams and forms a layer of cooling gases striking the sheet surface at a relatively low pressure.

By properly spacing the respective tubular members and their associated shells and by proper selection of the size of the slots 91, the entire surface of the sheet may be evenly cooled without producing optical distortions in the sheet.

If desired, the volume of air introduced into the tubular members may be increased by aspirating the air supplied to the tubular members with atmospheric gases. Therefore, according to another aspect of the invention a modified form of supplying air to the tubular members is shown in FIG. 12. In the modified form of the invention the coupling 83 is replaced by a nozzle 100 which is supported on an arm 101, secured to the bracket 95, by a clamp 102. The tubular member is provided with an extension 103 which extends slightly beyond the open end of the nozzle 100. Therefore as the pressurized air flows through the nozzle additional atmospheric air or gas is drawn into the tubular member as indicated by the arrows 104.

Separation of the mold parts for cooling the opposite surfaces in the bending area may be accomplished in a variety of different ways. By way of example, the upper mold part may be moved after the sheet has been pressed between the complemental shaping surfaces while the lower mold part is stopped in its raised position; the lower mold may be temporarily halted during its downward movement; or both of the mold parts may be moved to separate the shaping surfaces after the sheets are bent for the cooling operation.

Herein, the separation is accomplished by moving the upper mold part and temporarily halting the lower mold part above the path of the moving sheet. For this purpose, the mounting means 37 (FIG. 3), to which previous reference has been made, includes means for raising and lowering the upper mold part. The mounting means including the means for raising and lowering the upper mold part may include a fluid cylinder 105 (FIG. 3) supported on a base plate 106 carried by the beams 38 with a piston rod 107 slidably received in the cylinder and its free end connected to the mounting frame 36 at 108. The mounting frame and upper mold part 30 are guided for vertical movement by rods 109 projecting above the upper surface of the mounting frame and slidably received guide members 110 carried by the base plate 106. Therefore, raising and lowering the upper mold part may be accomplished by supplying fluid pressure to the appropriate ends of the fluid cylinder through conduits 112 and 113 (FIG. 1).

The travel of the lower mold part may be interrupted in several different ways; for example, the rotation of the cam shaft 54 of the actuating mechanism could be temporarily halted. In the present instances, however, for purposes of simplicity, a portion of the generated surface of the cam 53 is flattened, as at 114 (FIG. 1), to provide a dwell period during which there is no movement of the lower mold part. This dwell period may be produced at the upper limit of travel or during the downward travel of the lower mold part so long as the interruption occurs before the bent sheet is returned to the conveyor rolls 27.

In operation, after the sheets are bent by being pressed between the shaping surfaces, the upper mold part is raised, and while the sheets are carried by the shaping surface of the lower mold part, the movement of the lower mold part is interrupted. During the interruption, pressurized air is introduced into the tubular members 67 and 80 and the arms carrying the tubular members 67 are swung from one side of the upper mold part to the opposite side and returned along the arcuate path indicated by the arrows $a$ in FIG. 4 to sweep the upper surface of the sheet while the air entering the tubular members 80 flows through the passageway and is diffused upon passing through the perforated portion of the shell to strike the lower surface of the sheet in an evenly distributed layer.

In order to insure that the temperature of the heated sheets will not decrease below that necessary for proper tempering, after the slightly cooled sheet is returned to the conveyor, it is desirable to have the sheets carried from the bending area by the conveyor rolls at a higher rate of speed when compared to the rate of speed at which the sheets move through the furnace.

Figures 11, 13:
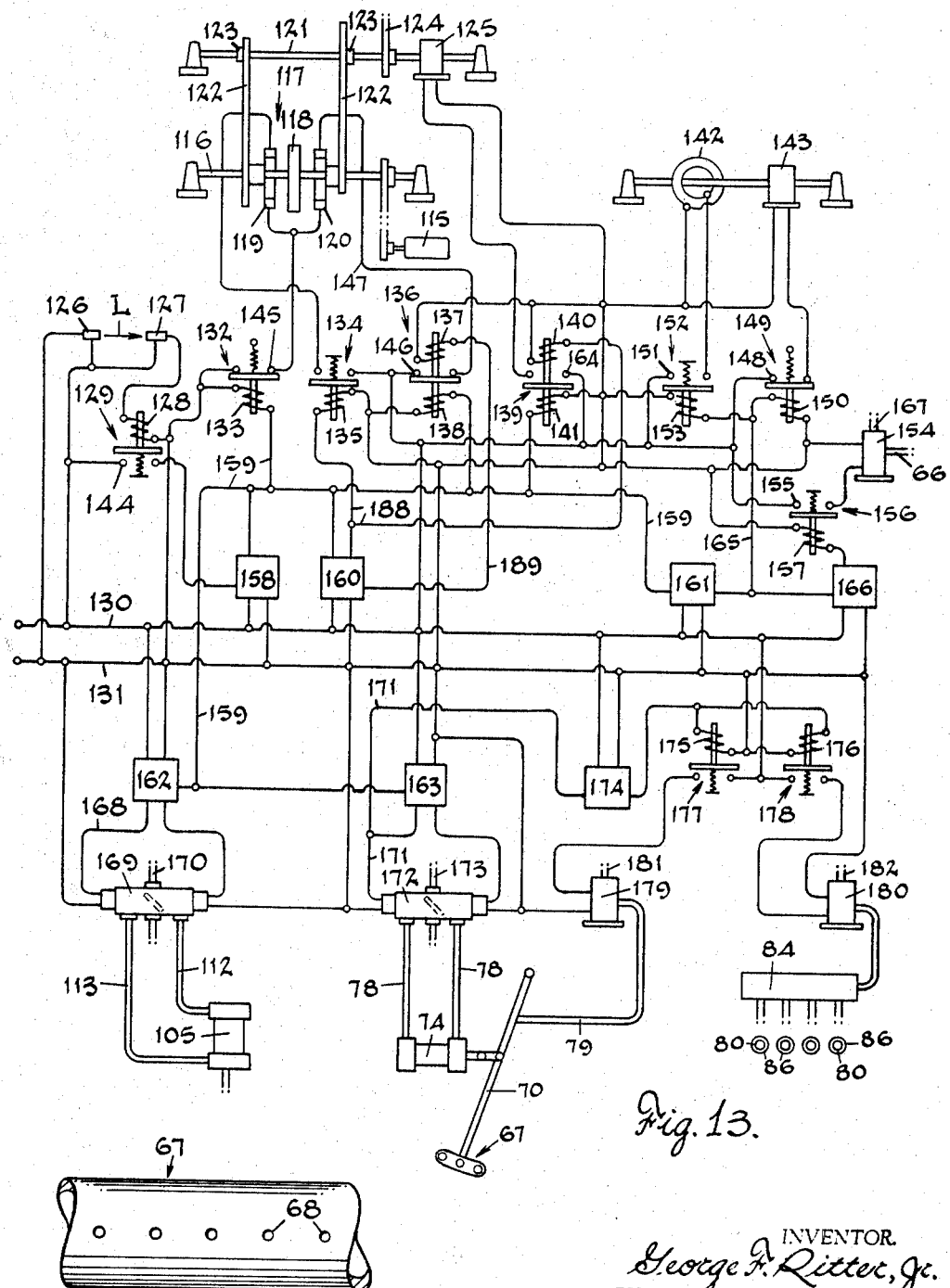
FIG. 11 is an enlarged fragmentary detailed view of one of the elements of the present invention.
FIG. 13 is a diagrammatical illustrative view of a control circuit which may be utilized for controlling the various phases of the bending operation of the apparatus shown in FIG. 1.

For this purpose, the power source P is a variable speed transmission unit and, as shown diagrammatically in connection with the control circuit, FIG. 13, may include a motor 115 coupled to a first or input shaft 116 of a magnetic clutch 117, with the shaft being held in position to rotate about a fixed axis. A driving member or armature 118 is fixed to the shaft 116 intermediate its ends to rotate therewith and be selectively engageable by either of two driven members 119 and 120. The driven members 119 and 120 are coupled to a second or output shaft 121 journaled to rotate about a fixed axis parallel to the axis of the shaft 116 and, the respective driven or magnetic members are connetced to the second shaft through suitable belts 122 entrained about pulleys 123 connected to the respective shafts. The shaft 121 is in turn connected to the conveyor rolls 27 by a belt 124.

As is well known, by proper selection of the size of the pulleys the second shaft may be rotated at either of two speeds dependent upon which of the driven members is engaged by the driving member of the clutch. Furthermore when the clutch is entirely disengaged rotation of the second shaft is terminated and the rotation may be rapidly halted with the aid of a magnetic brake 125 associated with the shaft 121 to be activated when the clutch is entirely disengaged.

Preferably all phases of each bending sequence or cycle for each of the respective sheets are automatically controlled for suitable electrical circuitry, such as the control circuit shown in FIG. 13. For this purpose, a light source 126 is located at the entrance end of the bending area to produce a restricted beam of light L passing across the path of the moving sheets, which beam is received by a photoelectric cell 127. The photoelectrical cell is in turn connected to a solenoid 128 of a normally open relay switch 129 which controls the beginning of each bending cycle.

The circuit for controlling a bending cycle includes a power supply from an electrical source through supply lines 130 and 131 which are connected to the various elements of the control circuit.

The transmission unit is controlled by a normally closed relay switch 132 having opposed solenoid 133, a normally open relay switch 134 having opposed solenoid 135 and relay switch 136 having opposed solenoids 137 and 138. The magnetic brake 125 is controlled by a relay switch 139 having opposed solenoids 140 and 141.

The means for intermittently raising and lowering the lower mold part may include a combined magnetic clutch 142 and brake 143, commonly referred to as a cycle dyne unit, which is part of the power source 57 and controls rotation of the shaft 54.

Before a bending cycle is initiated the beam of light L is impinging on the photoelectric cell 127 and the circuit through the solenoid 128 of relay switch 129 is open with contacts 144 being disengaged. Power is supplied to one side of the magnetic members 119 and 120 through the normally closed contacts 145 of relay switch 132. Contacts 146 of a relay switch 136 remain engaged from a previous bending cycle thereby supplying power through the magnetic member 120 via line 147 which in turn will drive the conveyor rolls at the slower rate of speed. The brake of the cycle dyne unit is energized through the normally closed contacts 148 of the spring biased relay switch 149 having opposed solenoid 150 while the clutch is normally disengaged by the normally open contacts 151 of the spring biased relay switch 152 having opposed solenoid 153. The stops 65 are in the raised position by having the valve 154 de-energized by the normally open contacts 155 of spring biased relay switch 156 having opposed solenoid 157 with the valve thereby supplying fluid pressure from a source (not shown) through conduit 66 to the fluid cylinders 62.

A bending cycle is initiated by having a glass sheet moving along the conveyor system momentarily interrupt the light beam L to the photoelectric cell 127 which thereby temporarily completes the circuit through solenoid 128 of relay switch 129. This will temporarily engage contacts 144 which will energize a timer 158. The timer 158 and in turn will monitor a sufficient period of time to allow the sheets to move into the bending area and into engagement with the stops 65 located in the path of the moving sheets.

After this interval of time the timer 158 completes a circuit via line 159 to solenoids 133, 138 and 141 and energizes timers 160, 161, 162 and 163. The energizing of solenoid 133 will disengage contacts 145 of relay switch 132 which will open the circuit to both of the driven members 119 and 120 thereby disengaging both of said members from the armature 118. At the same time, the completion of the circuit through solenoid 141 of relay switch 139 will engage contacts 164 of relay switch 139 to complete the circuit to the magnetic brake which in turn halts rotation of the shaft 121.

The timer 161 will monitor the period of time required to disengage the clutch 117 and engage the brake 125 and thereafter will complete a circuit via line 165 to solenoids 150 and 153 of relay switches 149 and 152, respectively, which will reverse the position of the relay switches to disengage the brake and engage the clutch thereby beginning rotation of the shaft 54 through one cycle. At the same time, the timer 161 will activate the timer 166 which monitors the period of time required to disengage the brake and engage the clutch to begin raising the lower mold part. After this time interval, the timer 166 will complete the circuit through solenoid 157 of normally open relay switch 156 to complete the circuit to the electrical control valve 154 which will reverse the position of the valve and connect conduits 66 to a vent line 167 thereby allowing the stops to descend by gravity below the path of the moving sheet.

The timer 162 will monitor a period of time sufficient to allow the lower mold part to be raised in close proximity to the upper mold part and thereafter will complete the circuit via line 168 to one side of an electrically operated control valve 169. This will reverse the position of the valve, which is normally supplying pressure to the head end of the cylinder 105 from supply line 170 through conduit 112, and supply fluid pressure to the lower end or rod end of the cylinder 105 via conduit 113 to raise the upper mold part.

The timer 163 will monitor a period of time during which the lower mold part is raised above the path and in close proximity to the upper mold part and the upward movement of the upper mold part. Thereafter the circuit is completed via line 171 to one end of an elecrtically operated control valve 172, which is normally supplying fluid pressure to the rod end of the cylinder 75 through supply line 173, to reverse the position of the valve and supply fluid pressure to the head end of the fluid cylinder to move the tubular members 67 across the surface of the sheet. When the timer 163 times out the position of the valve 172 is again reversed to supply fluid pressure to the rod end of the cylinder 75 and return the tubular members to their original position.

The timer 163 also actuates a timer 174 via line 171 which immediately completes the circuits through solenoids 175 and 176 to close the normally open relay switches 177 and 178, respectively. The closing of relay switches 177 and 178 will energize the valves 179 and 180 to supply pressurized air from supply lines 181 and 182 to the tubular members 67 and 80.

When the timer 174 times out the relay switches 177 and 178 will be forced open by their respective springs to de-energize valves 179 and 180. The timer 162 operates during the combined operational time of the timers 163 and 174 whereupon it times out to reverse the position of the valve 169 and supply fluid pressure to the head end of the cylinder 105 to lower the upper mold part.

The timer 160 monitors a period of time sufficient to allow the lower mold part to lift the sheet off the conveyor rolls 27 whereupon it completes a circuit via lines 188 through solenoids 135 and 140 which will release the brake and complete the circuit through the magnetic member 119 to operate the conveyor rolls 27 at the faster rate. When the timer 160 times out, the circuit will be opened through solenoid 135 and complete the circuit through solenoid 137 via line 189 to disengage the member 119 and engage member 120 with armature 118 and thereby operate the conveyor rolls 27 at the slower rate of speed.

OPERATION

A brief description of the bending apparatus will aid in the understanding of the invention. A heated flat glass sheet is moved between the mold parts 30 and 31 and into engagement with the transversely spaced stops 65 whereupon the conveyor rolls are stopped. The shaft 54 is rotated to raise the lower mold part and lift the sheets off the conveyor into pressing engagement between the complemental shaping surfaces 32 and 33 to bend the sheet to the desired configuration.

After the sheets are bent the upper mold part is raised and the cam follower 51 moves across the flattened portion 114 of the cam to halt the movement of the lower mold part. While the lower mold part is stationary, the tubular members 67, having pressurized air temporarily passed therethrough and in streams toward the sheet surface, are passed back and forth across the upper surface of the heated bent sheet to move or oscillate the streams relative to the sheet. Simultaneous therewith, pressurized air is passed through the tubular members 80 to flow in streams through the openings through the passageway and the perforated portion of the shell and against the lower surface of the sheet.

After the sheets have been cooled sufficiently to set the curvature in the sheet, the sheet is returned to the conveyor rolls 27 by the continued rotation of shaft 54 to return the sheet to the conveyor to be moved into and through the tempering area.

Although the upper tubular members are shown as being moved across the surface of the sheet to move the streams relative to the sheet surface, it is readily apparent that the cooling of the upper surface could be accomplished in a manner similar to the lower surface of the sheet. For example, the tubular members 80 and associated shells could be carried by a framework attached to the arms 71 to be moved into position and thereafter air could be passed therethrough to strike the upper surface of the sheet.

It is to be understood that the form of the invention therewith shown and described is to be taken as an illustrative embodiment only of the same, and that various changes in the shape, size and arrangement of parts may be resorted to without departing from the spirit of the invention.

I claim:

1. In apparatus for heat treating glass sheets, including a bending mold comprising a pair of spaced mold parts having complemental shaping surfaces; means for moving at least one of said mold parts toward and away from the other mold part to press a heat softened glass sheet between the shaping surfaces thereof to bend said sheet to the desired curvature and to then return said mold parts to said spaced relationship; and means for cooling at least one surface of the glass sheet after bending and while said sheet is still in contact with the shaping surface of said one mold part; the improvement which consists in that said cooling means comprises a first tubular member disposed parallel to said sheet surface and having orifices formed therein opening away from said shaping surface, means supplying said tubular member with pressurized gas; and a second tubular member coaxial with and surrounding the first to define an annular expansion chamber between them and having a perforated portion adjacent said shaping surface, said portion having a plurality of discrete openings formed therein, whereby streams of pressurized gas flowing from said first orifices travel around said first tubular member through said expansion chamber and flow through said openings prior to impinging against the sheets.

2. Apparatus for heat treating glass sheets as defined in claim 1, in which said perforated portion comprises a screen member covering an elongated slot formed in the wall of said second tubular member adjacent said shaping surface, and fixed to said member adjacent said slot.

3. Apparatus for heat treating glass sheets as defined in claim 1, in which said gas supplying means comprises a gas supply tube ending in a nozzle having its outlet end disposed within said first tubular member adjacent one end thereof, said nozzle end being smaller than the inside diameter of said first tubular member to leave an annular area therebetween for the entrance of ambient gas to said member.

References Cited

UNITED STATES PATENTS

| | | | |
|---|---|---|---|
| 1,971,268 | 8/1934 | Long | 65—348 X |
| 1,999,337 | 4/1935 | Meer | 65—348 |
| 2,365,138 | 12/1944 | Mongan | 65—114 |
| 2,478,090 | 8/1949 | Devol | 65—25 |
| 2,826,005 | 3/1958 | Wynne | 65—182 |
| 3,265,484 | 8/1966 | Ritter | 65—104 |

S. LEON BASHORE, Primary Examiner

A. D. KELLOGG, Assistant Examiner

U.S. Cl. X.R.

65—104, 114, 119, 287, 351